(12) United States Patent
Tamaoka

(10) Patent No.: US 7,514,830 B2
(45) Date of Patent: Apr. 7, 2009

(54) SPINDLE MOTOR AND RECORDING DISK DRIVING DEVICE INCLUDING THE SAME

(75) Inventor: Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 298 days.

(21) Appl. No.: 11/163,680

(22) Filed: Oct. 27, 2005

(65) Prior Publication Data

US 2006/0103248 A1    May 18, 2006

(30) Foreign Application Priority Data

Oct. 27, 2004  (JP)  ............... 2004-312005
Oct. 26, 2005  (JP)  ............... 2005-311755

(51) Int. Cl.
*H02K 5/12*  (2006.01)
(52) U.S. Cl. .......................... 310/88; 310/90
(58) Field of Classification Search ............ 310/88, 310/90, 91
See application file for complete search history.

(56) References Cited

U.S. PATENT DOCUMENTS 5,319,270 A    6/1994  Tanaka et al.
5,410,201 A    4/1995  Tanaka et al.
6,486,578 B2   11/2002 Kitahori et al.
7,084,536 B2 * 8/2006  Obata et al. ............. 310/90
2007/0013240 A1* 1/2007 Aiello et al. ............. 310/52
2007/0090716 A1* 4/2007 Oki et al. ................. 310/216

FOREIGN PATENT DOCUMENTS

| JP | H04-172949 A | 6/1992 |
| JP | H04-178160 A | 6/1992 |
| JP | 05284710 | * 10/1993 |
| JP | H07-099746 A | 4/1995 |
| JP | 07264832 | * 10/1995 |
| JP | 2002-125354 A | 4/2002 |
| JP | 2004-072869 A | 3/2004 |
| JP | 3574998 B2 | 7/2004 |
| JP | 2004-362635 A | 12/2004 |
| JP | 2005-160202 | 6/2005 |

* cited by examiner

*Primary Examiner*—Nguyen N Hanh
(74) *Attorney, Agent, or Firm*—Volentine & Whitt, PLLC

(57) ABSTRACT

A spindle motor in one inventive implementation includes a rotor hub (10) for retaining a rotor magnet (70) and a stator (80) which is faced to the radial inner side of the rotor magnet (70) with a gap interposed therebetween. A shield sheet (90) is placed between the upper side of the winding (82) of the stator (80) and the disk mounting portion (13) of the rotor hub (10) and the outer peripheral edge of the shield sheet (90) is placed radially inside of the outer peripheral edge of the core back (83) of the stator (80).

16 Claims, 9 Drawing Sheets

US 7,514,830 B2

SPINDLE MOTOR AND RECORDING DISK DRIVING DEVICE INCLUDING THE SAME

BACKGROUND OF THE INVENTION

1. Field of the Invention

The present invention relates to an inner-rotor type spindle motor which rotates and drives a magnetic disk such as a hard disk and a recording disk driving device including the spindle motor.

2. Background Art

FIG. 8 illustrates an inner-rotor type spindle motor including a conventional magnetic shield sheet. FIG. 8 is an axial cross-sectional view, wherein the vertical direction in the figure represents the axial direction. FIG. 9 is a main part top view of the spindle motor of FIG. 8 viewed from above.

The spindle motor includes a stationary assembly 1, a bearing 2, and a rotor assembly 3 which is rotatably supported by the bearing 2.

The stationary assembly 1 includes a stator 4 and an annular-shaped shield sheet 5. The shield sheet 5 is placed above the stator 4 to prevent magnetic fluxes generated from the stator 4 generally during driving from being largely leaked to the region above the shield sheet 5.

In recent years, there has been a need for size reduction, thickness reduction and price reduction of information devices such as hard-disk driving devices. Therefore, there has been also a need for size reduction, thickness reduction and price reduction of spindle motors installed in information devices.

However, in the conventional exemplary configuration of FIG. 8 and FIG. 9, if an attempt is made to reduce the thickness of the stator 4 in the axial direction for thickness reduction, a hook 4a of the stator 4 provided just below the shield sheet 5 will make impossible to place the shield sheet 5 below the hook 4a. This increases the difficulty of reducing the thickness of the stator 4.

Furthermore, since the shield sheet 5 is formed to cover the entire stator 4 from thereabove and also to cover a stator fitting portion 6a of the housing 6, a high material cost is required for the shield sheet 5. This increases the difficulty of fabricating an inexpensive shield sheet 5.

BRIEF SUMMARY OF THE INVENTION

It is an object of the present invention to provide a spindle motor with a reduced size, a reduced thickness and a reduced price and a recording disk driving device including the spindle motor.

It is another object of the present invention to provide a spindle motor with excellent reliability and durability and a recording disk driving device including this spindle motor.

A spindle motor according to an example of the present invention includes a rotor assembly including a rotor magnet and a disk mounting portion for mounting the aforementioned recording disk on the outer peripheral portion thereof, wherein the rotor assembly which is rotatably supported by a bearing mechanism about a center axis.

Further, the spindle motor includes a stator faced to the outer peripheral portion of the rotor magnet with a radial gap interposed therebetween, wherein the stator includes a stator core and a winding, the stator core includes a plurality of teeth and an annular core back connecting an outer end portions of the plurality of teeth, and a winding is formed from a conductor wire wound around the plurality of teeth.

Further, the spindle motor includes a shield sheet which is made of a soft magnetic material and is placed between the disk mounting portion and the winding in the axial direction, wherein an outer peripheral edge of the shield sheet has a diameter equal to or smaller than that of an outer peripheral edge of the core back.

With the spindle motor according to the example of the present invention, it is possible to realize size reduction, thickness reduction and price reduction of the shield sheet.

Further, with the present invention, since the shield sheet is formed to have an outer peripheral edge with a diameter smaller than that of the bridging wire engaging portions of the stator, the shield sheet does not cover the bridging wire engaging portions, which enables size reduction and price reduction of the shield sheet.

With the present invention, it is possible to provide a spindle motor with excellent reliability and durability and a recording disk driving device including this spindle motor.

DETAILED DESCRIPTION OF THE INVENTION

Figure 1:
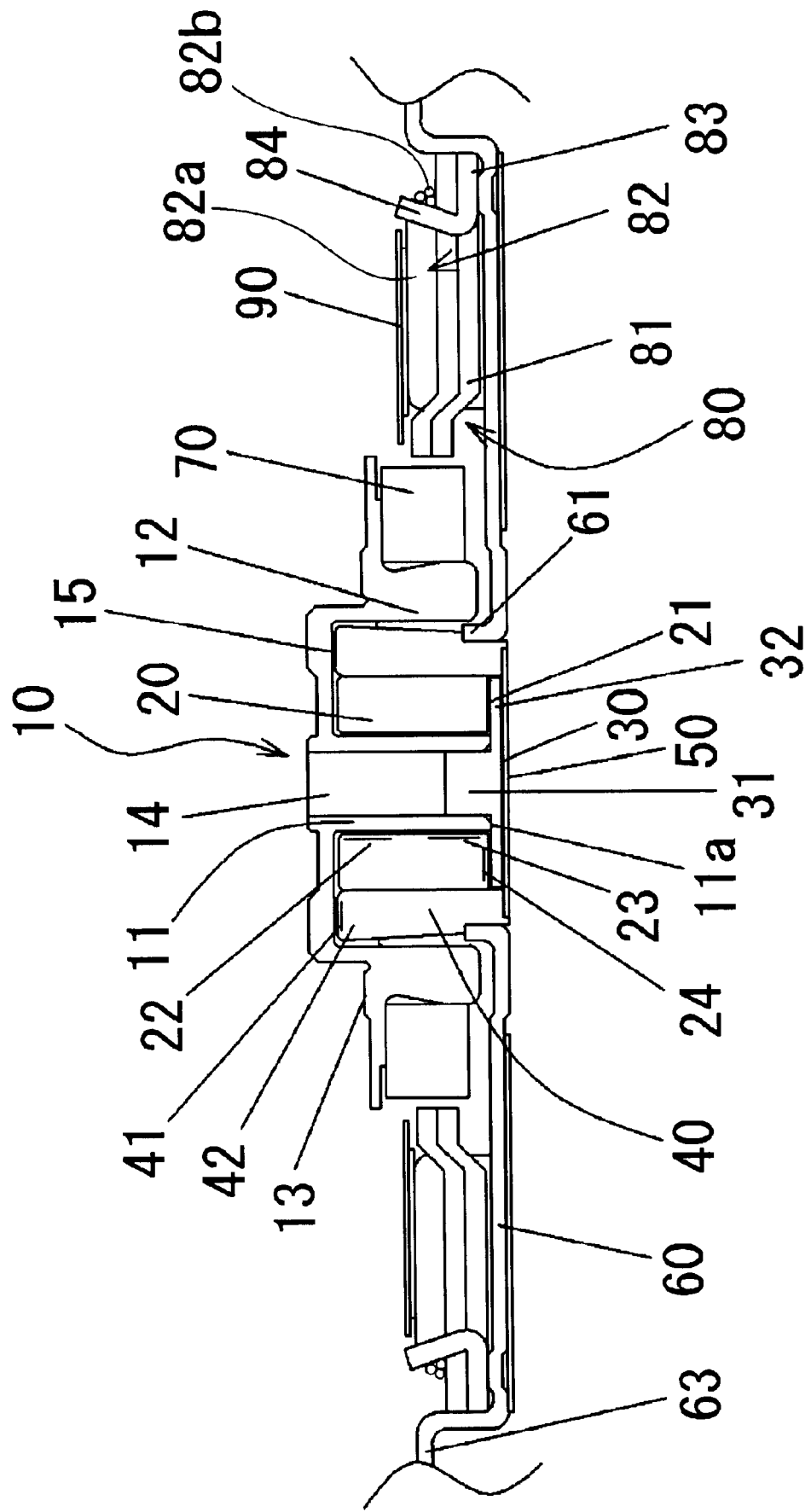
FIG. 1 is a longitudinal cross-sectional view illustrating a spindle motor according to a first embodiment of the present invention.

With reference to FIG. 1 to FIG. 7, embodiments of the present invention will be described. In the description of the present invention, descriptions of positions and orientations of respective components using terms "upper", "lower", "left" and "right" merely represent positions and orientations in the drawings and not represent positions and orientations of the respective components incorporated in an actual device.

First Embodiment

Figure 2:
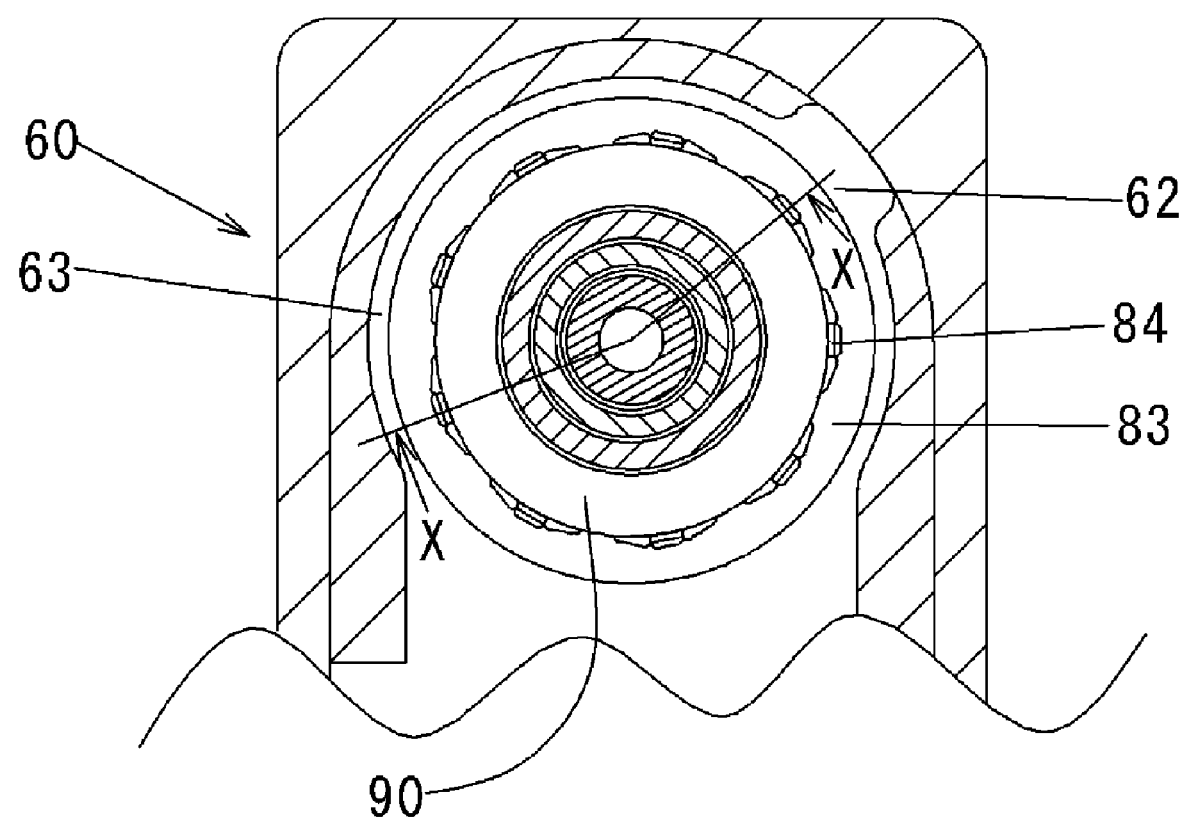
FIG. 2 is a main part top view of the spindle motor of FIG. 1.

FIG. 2 is a main part top view of a spindle motor of FIG. 1 and FIG. 1 is a longitudinal cross-sectional view of the X-X cross section of FIG. 2 viewed in the direction of arrows. A rotor hub 10 includes a shaft 11 and an outer cylindrical portion 12, and a disk mounting portion 13 for mounting a magnetic disk such as a hard disk thereon is formed at the upper side of the outer cylindrical portion 12. A rotor magnet 70 with annually arranged magnetic poles is retained on an outer peripheral surface of the outer cylindrical portion 12 through a means such as adhesive.

A hollow cylindrical-shaped sleeve 20 is faced to an outer peripheral surface of the shaft 11 with a radial gap interposed therebetween, an lower end surface 11a of the shaft 11 is positioned slightly below an lower end surface 21 of the sleeve 20 in the axial direction.

A pull-out preventing member 30 is secured to the shaft 11, in order to prevent the rotor hub 10 from being pulled out from the shaft 20 upwardly in the axial direction below the sleeve 20 and the shaft 11. The pull-out preventing member 30 includes a protruding portion 31 and a disk portion 32 extended radially from the protruding portion 31. The protruding portion 31 is fitted and secured in the hollow portion 14 of the cylindrical-shaped shaft 11 of the rotor hub 10. The disk portion 32 has an outer diameter slightly smaller than the outer diameter of the sleeve 20 and is secured and abutted to the lower surface 11a of the shaft 11 with no gap interposed therebetween. Further, the disk portion 32 is faced to the lower end surface 21 of the sleeve 40 with an axial small gap interposed therebetween.

A radial dynamic-pressure bearing portions 22 and 23 are provided in the small gap between an inner periphery of the sleeve 20 and an outer periphery of the shaft 11. A lower thrust dynamic-pressure bearing portion 24 is provided in an small gap between an lower end surface 21 of the sleeve 20 and an upper end surface of the disk portion 32.

The sleeve 20 is retained in a bearing housing 40 having a cylindrical shape with a bottom. The bearing housing 40 is closed at its lower end portion with a cap 50. An upper thrust dynamic-pressure bearing portion 41 is formed in the axial small gap between an upper end surface of the bearing housing and an lower surface 15 of the rotor hub 10. The upper thrust dynamic-pressure bearing portion 41 rotatably supports the rotor hub 10 with a lubricating fluid interposed therebetween. The diameter of an upper outer peripheral surface 42 of the bearing housing 40 is gradually reduced downwardly in the axial direction. A taper sealing portion with a gap which is gradually widened downwardly is formed at an radial gap between an inner peripheral surface of the outer cylindrical portion 12 of the rotor hub 10 and the upper outer peripheral surface 42 of the sleeve 40. The lubricating fluid is retained in the radial dynamic-pressure bearing portions 22, 23, the lower thrust dynamic-pressure bearing portion 24, the upper thrust dynamic-pressure bearing portion 41 and the taper sealing portion without interruptions and forms a gas-to-liquid interface between air and the lubricating fluid only in the taper sealing portion. The upper outer peripheral surface 42 of the bearing housing 40 forms a taper shape, which can enhance the force for retaining the gas-to-liquid interface of the lubricating fluid.

A base plate 60 is a member that is formed by applying presswork to a metal into a substantially rectangular shape. The base plate 60 has a hollow base cylindrical portion 61 at the center portion thereof. The bearing housing 40 is retained in an inner periphery of the base cylindrical portion 60.

The base plate 60 retains a stator 80 which is faced to the rotor magnet 70 with a radial gap interposed therebetween.

The stator 80 includes an annular core back 83 retained on the base plate 60, a plurality of teeth 81 which are radially extended from the core back 83 about the center axis, and a winding 82 including a conductor wires 82a wound around each of the plurality of teeth 81. At the inner peripheral portion between adjacent two teeth 81, there are provided a bridging wire engaging portion 84, in order to prevent an bridging wires 82b of the winding 82 from radially inwardly intruding from the core back 83. The bridging wire engaging portion 84 are formed by folding, upwardly in the axial direction, protrusions radially inwardly extended from the core back 83. The bridging wire engaging portion 84 is provided at the inner peripheral portions of the core back 83 between two teeth 81 adjacent to each other in the circumferential direction. Each of the bridging wire engaging portion 83 is provided at all the inner peripheral portions of the core back 83 between the two teeth adjacent to each other.

The term "a bridging wire" designates a wire extending from the end termination of the conductor wire wound around a single tooth, out of the plural teeth, to the start termination of the conductor wire wound around the next tooth.

In the three-phase-driven spindle motor according to the present embodiment, three bridging wires 82b are engaged with the radially outer sides of the respective bridging wire engaging portions 84.

A shield sheet 90 is placed above the winding 82 such that it abuts the winding 82. The shield sheet 90 is an annular metal member made of a soft magnetic material (for example, a stainless steel). The shield sheet 90 is formed to have an outer diameter inside of the respective bridging wire engaging portions 84 of the stator 80.

The shield sheet 90 prevents magnetic fluxes generated from the stator 80 from being largely leaked to above the shield sheet 90, during driving. Along with miniaturization and thickness reduction of motors, the mounting position of a magnetic disk such as a hard disk has gradually become closer to the stator. Along therewith, there has been increasingly the possibility of adverse influence of the magnetic fluxes of the stator or the rotor magnet on the magnetic disk. If the magnetic disk is influenced from magnetic fluxes from the stator or the rotor magnet, this may cause errors of reading from the magnetic disk or erasure of information written on the magnetic disk, at worst. Therefore, the shield sheet is placed between the stator and the magnetic disk. In the present embodiment, out of the magnetic fluxes generated from the stator 80 during driving, upwardly-flowing magnetic fluxes are captured in the shield sheet 90, flowed in the shield sheet 90 and then returned to the stator 90.

As illustrated in FIG. 2, as previously described, an outer peripheral edge of the shield sheet 90 is provided radially inside of the respective bridging wire engaging portions 84. Namely, the shield sheet 90 does not cover a shield sheet mounting portion 63 of the base plate 60 and a region 162 of the base plate 60 where the winding 82 is connected to an external power supply (not shown). This enables size reduction of the shield sheet 90 in the radial direction. As a result, it is possible to reduce the material cost for the shield sheet 90.

The stator 80 and the rotor magnet 70 generate a greater amount of magnetic fluxes at the region where they are closely faced to each other, than the other portions of the stator 80 and the rotor magnet 70. Further, magnetic fluxes are leaked from the aforementioned region where the stator 80 and the rotor magnet 70 are closely faced to each other to the region above the shield sheet 90. Therefore, the shield sheet 90 is required near the region where the stator 80 and the rotor magnet 70 are closely faced to each other.

On the other hand, the recording disk mounted on the disk mounting portion 13 is less influenced by magnetic fluxes, outside of the stator 80, namely at the upper portion of the core back 83, and at the region 162 of the base plate 60 where the winding 82 is connected to the external power supply.

As illustrated in FIG. 1, the shield sheet 90 is not provided at the regions above the respective bridging wire engaging portions 84. Accordingly, even if the shield sheet 90 is downwardly lowered in comparison with conventional configurations, the shield sheet 90 will not abut the base plate 60. Further, even if the number of times the conductor wire 82a is wound around the plurality of teeth 81 is reduced to lower the position of the shield sheet 90, the shield sheet 90 will not abut the respective bridging wire engaging portions 84. This enables reduction of the thickness of the spindle motor.

Further, as illustrated in FIG. 1, the portions of the plurality of teeth 81 around which the conductor wire 82a is wound are folded downwardly in the axial direction with respect to an tip end portions of the plurality of teeth 81. This enables placing the stator 80 and the shield sheet 90 at lower positions in comparison with conventional configurations, while keeping the axial magnetic centers of the rotor magnet 70 and the stator 80 in coincidence with each other. This enables size reduction and thickness reduction of the motor.

Second Embodiment

Figure 3:
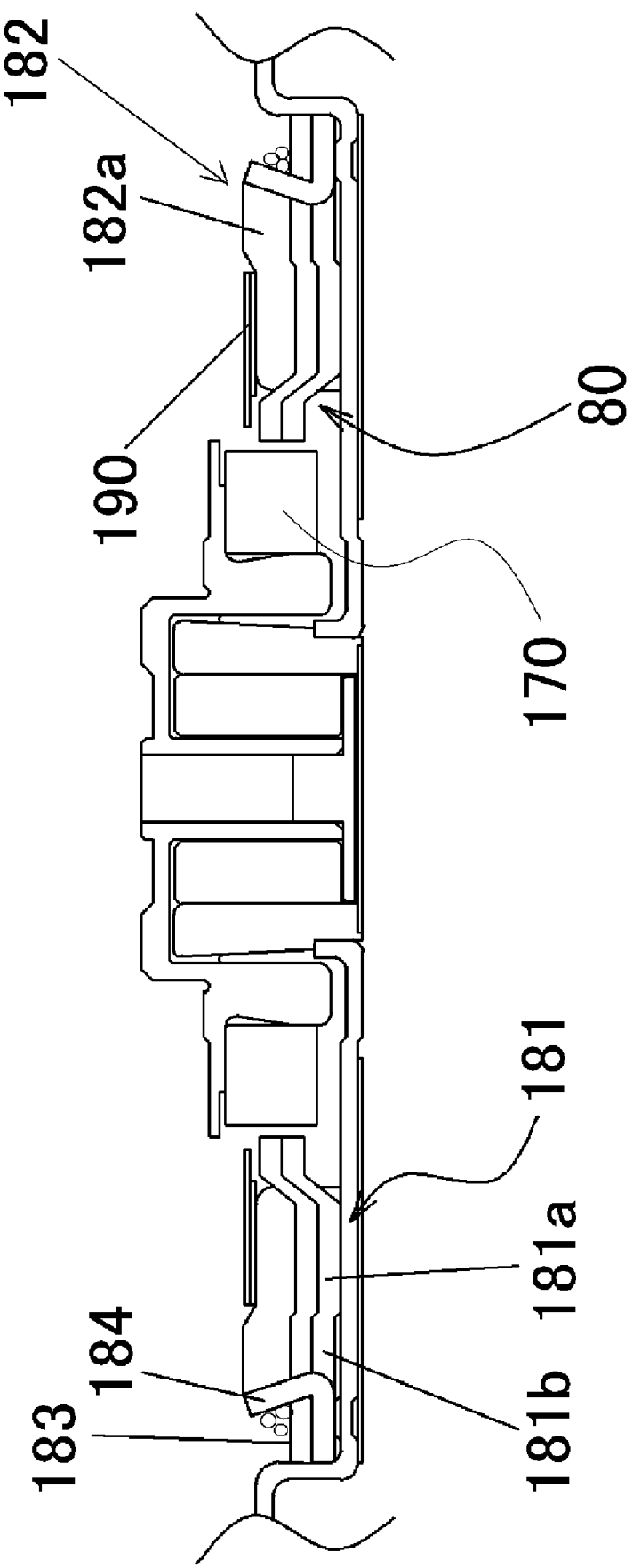
FIG. 3 is a longitudinal cross-sectional view illustrating a spindle motor according to a second embodiment of the present invention.
Figure 4:
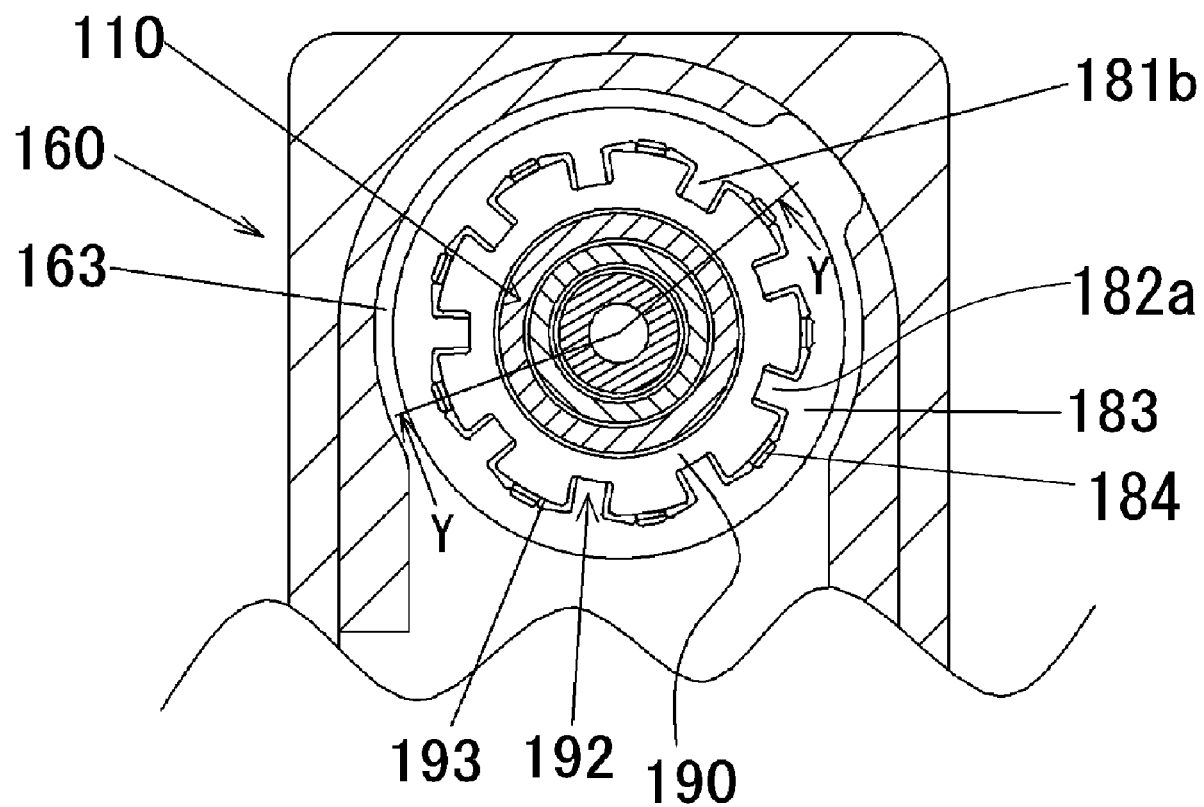
FIG. 4 is a main part top view of the spindle motor of FIG. 3.

With reference to FIG. 3 and FIG. 4, a shield sheet according to a second embodiment of the present invention will be described. FIG. 4 is a main part top view of a spindle motor of FIG. 3. FIG. 3 is a longitudinal cross-sectional view of the Y-Y cross section of FIG. 4 viewed in the direction of arrows. The spindle motor according to the second embodiment has the same basic configuration as that of the spindle motor according to the first embodiment. As illustrated in FIG. 3 and FIG. 4, a shield sheet 190 is placed radially outside of the rotor magnet 70 such that the shield sheet 190 is faced to the rotor magnet 70 with a gap interposed therebetween. The shield sheet 190 is formed to have different two diameters. An outermost peripheral edge 193 of the shield sheet 190 is provided radially inside of an respective bridging wire engaging portions 84. At the portions of the shield sheet 190 which overlap with an plurality of teeth 181 in the axial direction, there are formed a plurality of cutout portions 192 extending radially inwardly.

An innermost peripheral edges 193 and the cutout portions 192 of the shield sheet 190 are formed to have diameters smaller than those of the respective bridging wire engaging portions 184 and an shield sheet mounting portion 163 of an base plate 160, which enables provision of the same effects and advantages as those of the first embodiment.

As illustrated in FIG. 3, an conductor wires 182a are wound around the portions of the teeth 181 which are positioned at the cutout portions 192 of the shield sheet 190 a greater number of times than around an tip end portions of the teeth 181. In other words, the upper end height of the laminated conductor wire around the portions of the plurality of teeth 181 positioned at the cutout portions 192 of the shield sheet 190 is higher than an upper height of the laminated conductor wire around the tip end portions of the plurality of teeth 181.

This can increase the number of windings of the conductor wire 182a around the respective plurality of teeth 18. Consequently, even when the motor is driven at the same rotation speed, the value of electric current applied to the motor can be reduced. Thus, for a desired rotation speed, a reduced electric current can be used, thus resulting in reduction of the electric power.

Further, the plurality of teeth 181 of the stator 180 can be folded downwardly in the axial direction in correspondence with the cutout portions 192 and the outermost peripheral edges 193 of the shield sheet 190 to further reduce the thickness. Namely, an first portions 181a of the plural teeth 181 in correspondence with the cutout portions 192 can be folded downwardly in the axial direction to further reduce the thickness in the axial direction in comparison with conventional configurations. Further, a second portions 181b in correspondence with the regions from the cutout portions 192 to the core back 183 can be folded slightly upwardly in the axial direction, since the number of windings of the conductor wire 182a is increased. This can increase the number of windings of the conductor wire 182a without inducing the contact between the conductor wire 182a and the base plate 160. This enables further reducing the electric current value.

Third Embodiment

Figure 5:
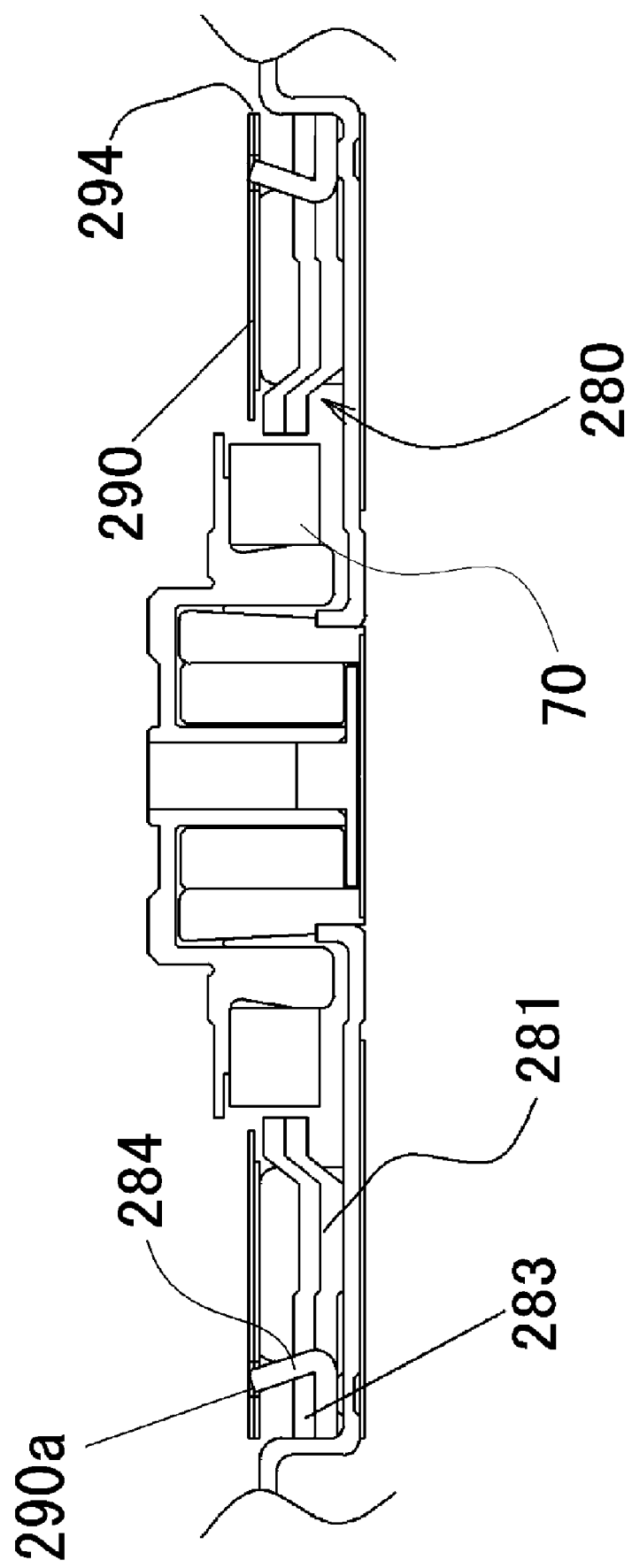
FIG. 5 is a longitudinal cross-sectional view illustrating a spindle motor according to a third embodiment of the present invention.
Figure 6:
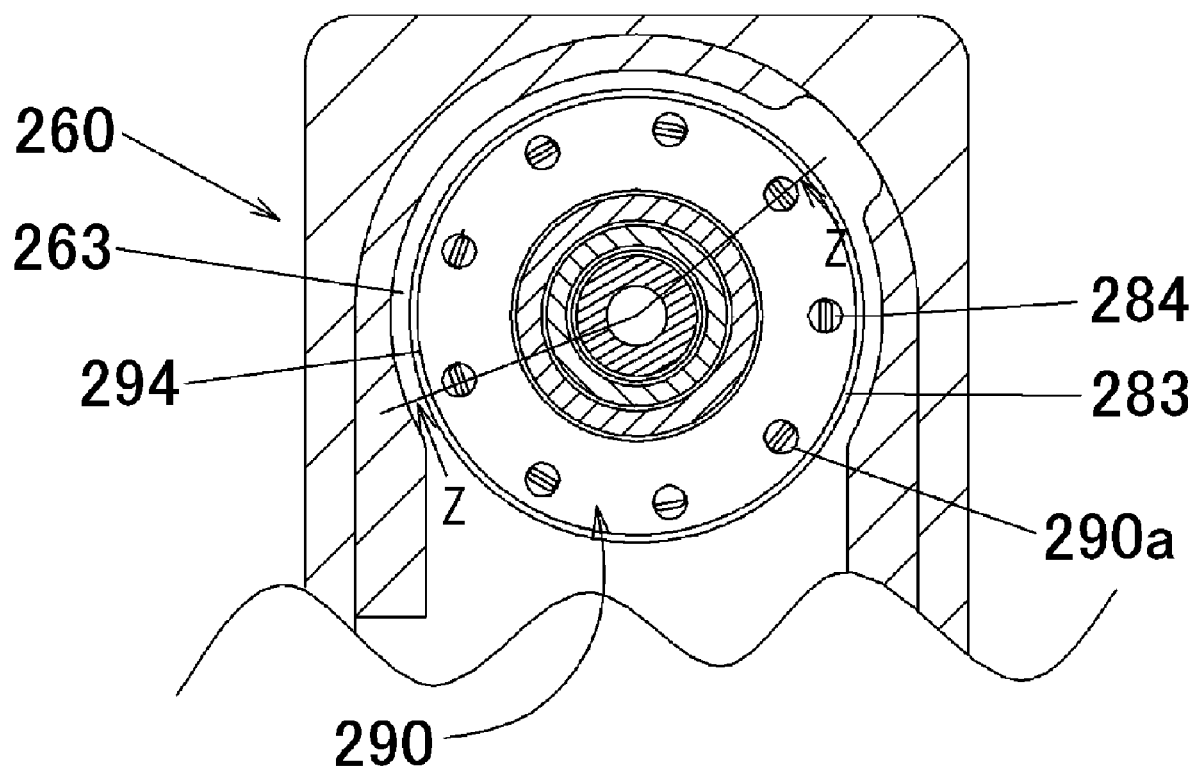
FIG. 6 is a main part top view of the spindle motor of FIG. 5.

With reference to FIG. 5 and FIG. 6, a shield sheet according to a third embodiment will be described. FIG. 6 is a main part top view of a spindle motor of FIG. 5. FIG. 6 is a longitudinal cross-sectional view of the Z-Z cross section of FIG. 6 viewed in the direction of arrows. The spindle motor according to the third embodiment has the same basic configuration as that of the spindle motor according to the first embodiment.

A shield sheet 290 is placed radially outside of the rotor magnet 70 such that the shield sheet 290 is faced to the rotor magnet 70 with a gap interposed therebetween. An outermost peripheral edge 294 of the shield sheet 290 is substantially the same as that of an outer peripheral edge of the core back 283. At the portion of the shield sheet 290 which axially overlap with an respective bridging wire engaging portions 284, the shield sheet 290 is partially cut out to form an shield sheet cutout portions 290a. An tip end portions of the respective bridging wire engaging portions 284 are inserted in the shield sheet cutout portions 290a, which enables placing the shield sheet 290 below the tip end portions of the respective bridging wire engaging portions 284 in the axial direction. This can reduce the thickness of the motor.

Recording Disk Drive

Figure 7:
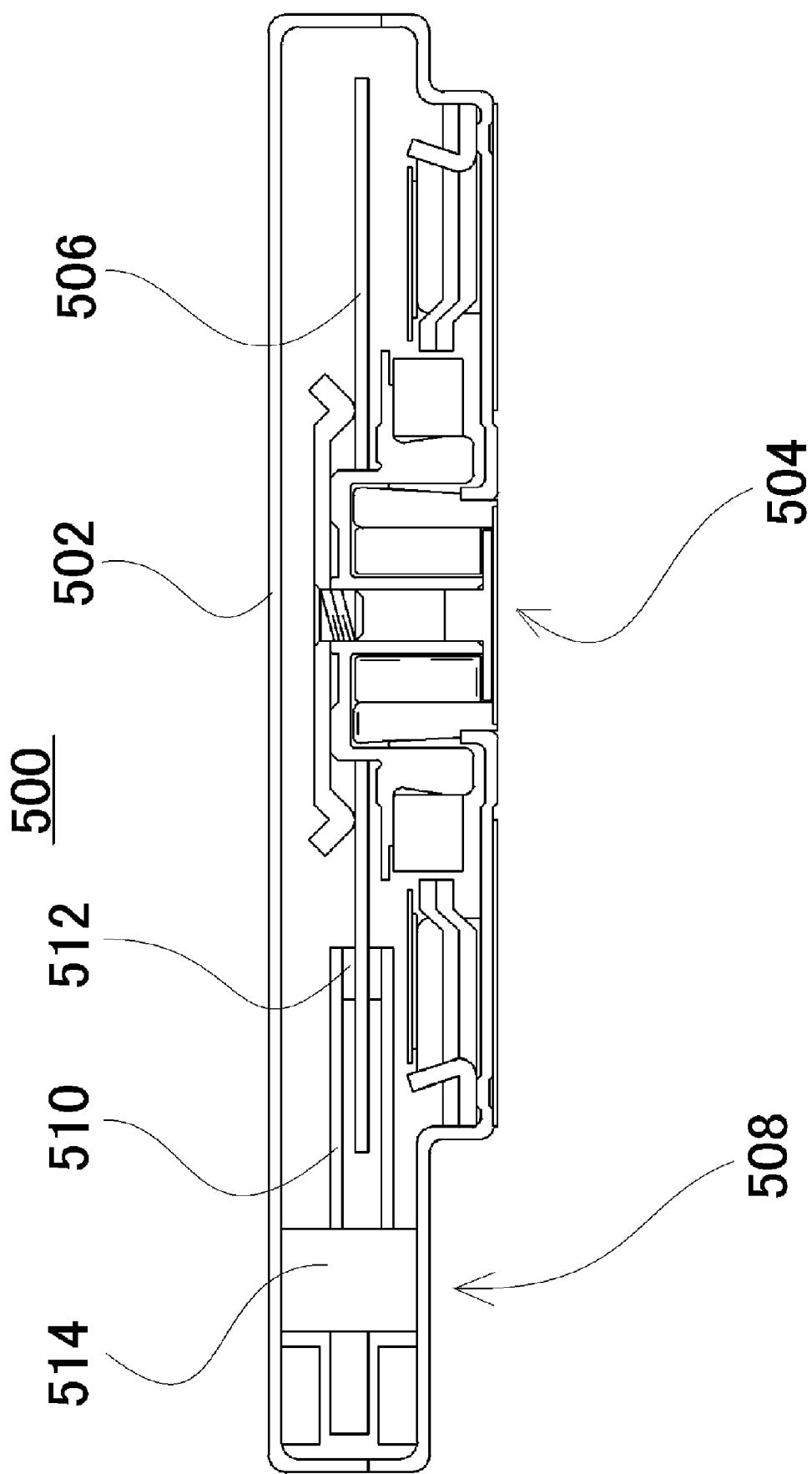
FIG. 7 is a longitudinal sectional view that depicts a recording disk drive
Figure 8:
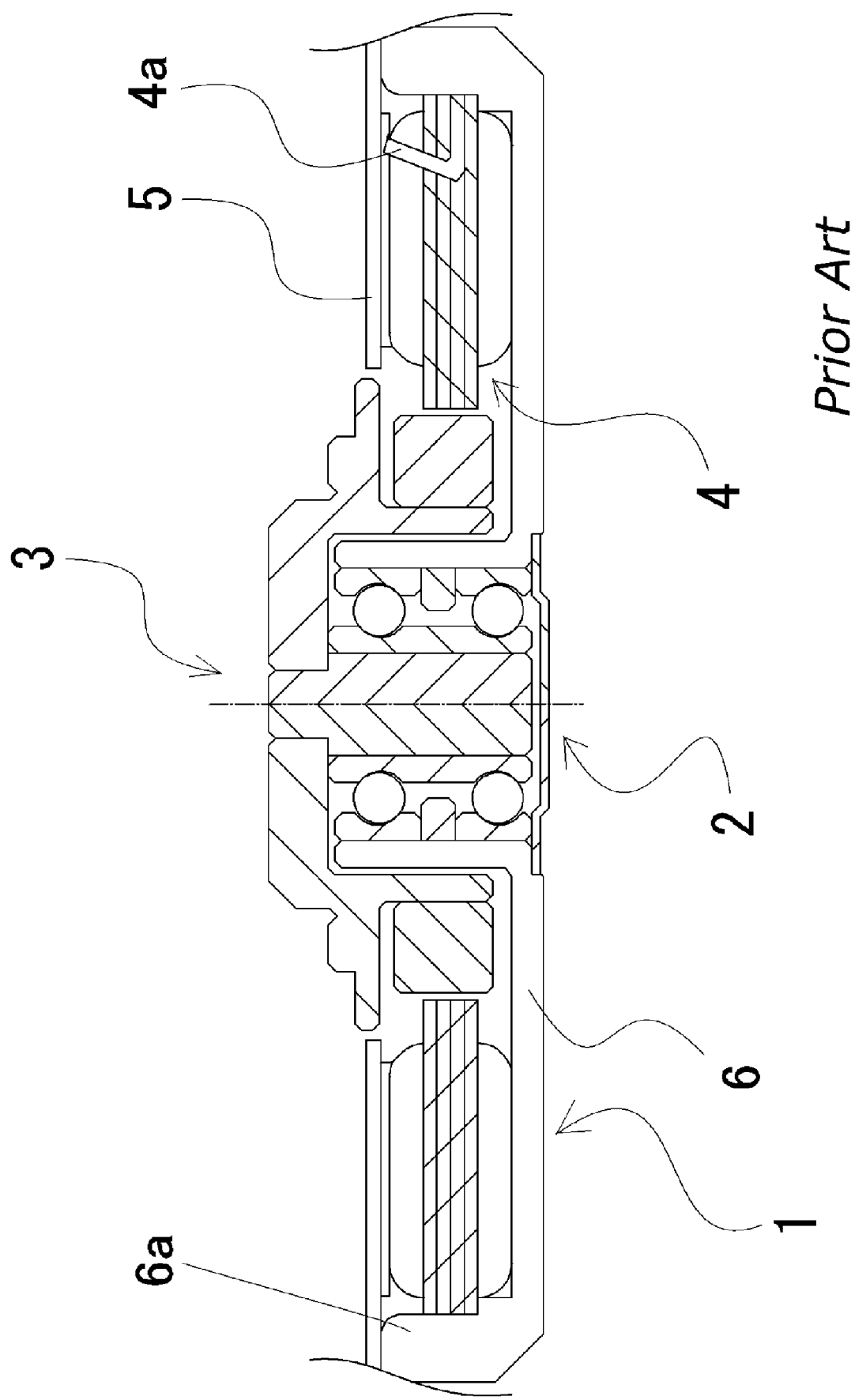
FIG. 8 is a longitudinal cross-sectional view illustrating a conventional exemplary spindle motor.
Figure 9:
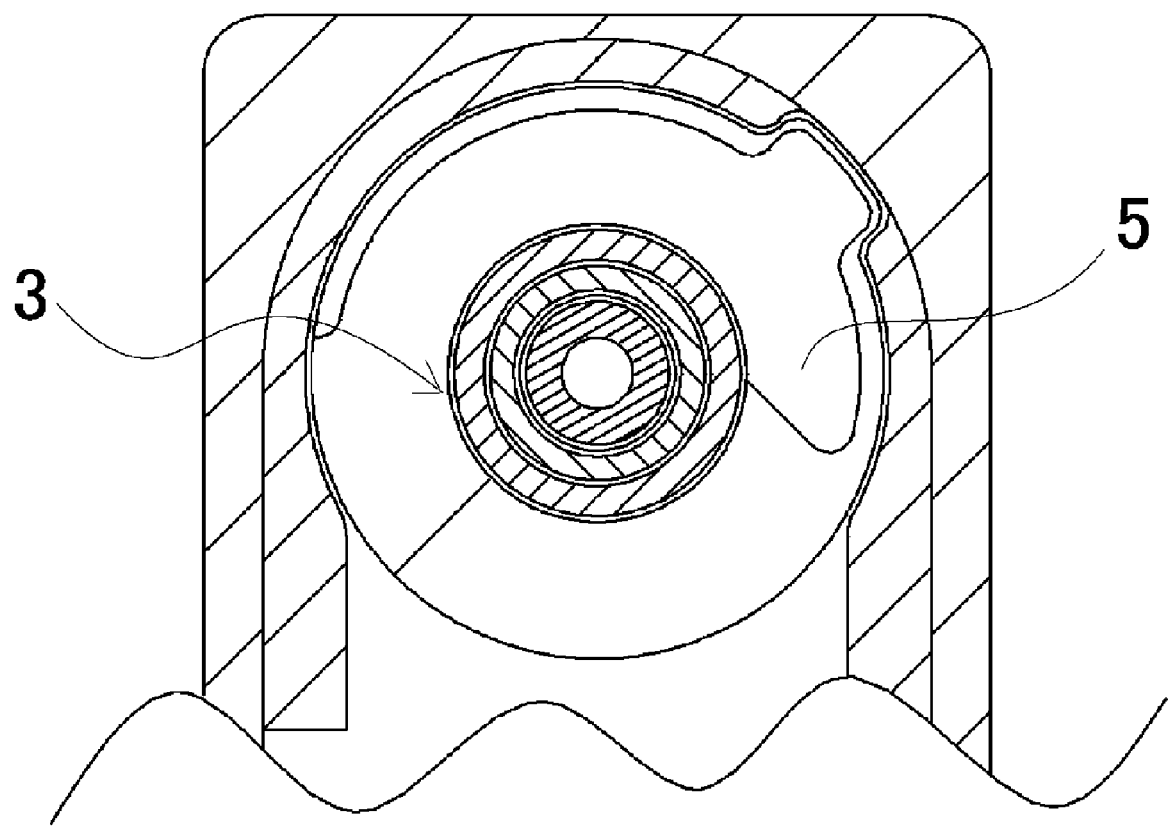
FIG. 9 is a main part top view of the spindle motor of FIG. 8.

An internal configuration of an recording disk drive 500 will be described with reference to FIG. 7.

The recording disk drive 500 is constituted by a rectangular housing 502. An interior of the housing 502 forms a clean space in which dust and the like are extremely small in amount, and a spindle motor 504 to which a disk-shaped hard disk 506 for recording information is attached is provided in the housing 502.

Further, an access unit 508 is provided in the housing 502. This access unit 508 includes a magnetic head 512 for reading and writing information from and onto the hard disk 506, an arm 510 that supports this magnetic head 512, and an actuator 514 that moves the magnetic head 512 via the arm 510 to positions over the hard disk 506 at which the reading or writing of information occurs. As can be seen in the figure, the magnetic head 512 may be interposed between the hard disk 506 and the magnetic shield plate (not numbered in the figure). According to the present invention, despite the presence of the bridging wire engaging portions, the hard disk driving device is relatively thin and yet a sufficient space is secured between the magnetic shield plate and the disk to accommodate the magnetic head 512.

By adopting the spindle motor shown in FIGS. 1 to 6 as the spindle motor 504 of the recording disk drive 500 thus configured, it is possible to make the recording disk drive small in size and thin while ensuring good functions and to provide the recording disk drive excellent in both reliability and durability.

While embodiments of the present invention have been described, the present invention is not limited to the aforementioned embodiments and various changes may be made without departing from the spirit of the invention.

For example, a so-called gas dynamic pressure bearing using air as the fluid may be employed as the motor bearing mechanism. Also, the bearing mechanism is not necessarily required to use fluid dynamic pressures and may be a ball bearing.

What is claimed is:

1. A spindle motor for use in holding and rotating a data storage disk, the spindle motor comprising:

a rotor assembly supported in the motor so as to be rotatable about a center axis extending in the axial direction of the motor, the rotor assembly including a rotor magnet comprising an annular arrangement of magnetic poles, and a disk mounting portion to which the disk is to be mounted, the annular arrangement of magnetic poles having opposite ends in the axial direction of the motor, and the disk mounting portion constituting an outer peripheral portion of the rotor assembly;

a stator opposing an outer peripheral portion of the rotor magnet and spaced radially therefrom such that a gap is present therebetween, the stator including a stator core having a plurality of teeth which are arrayed about the center axis, and an annular core back from which the plurality of teeth extend radially inwardly such that tip ends of the teeth are oriented towards the center axis, and at least one winding in the form of a conductor wire wound around the teeth of the stator core; and a shield sheet of a soft magnetic material, the shield sheet being located between the disk mounting portion of the rotor assembly and the winding in the axial direction of the motor as disposed at the same level in the axial direction as at least a portion of the rotor magnet, the shield sheet having an inner peripheral edge located radially across from and encircling the rotor magnet at a level in the axial direction of the motor between respective outer peripheral edges of the opposite ends of the annular arrangement of magnetic poles, and the outer diameter of the shield sheet being equal to or smaller than that of the annular core back.

2. The spindle motor according to claim 1, wherein the stator core also includes bridging wire engaging portions located at inner peripheral portions of the annular core back, respectively, each of the bridging wire engaging portions being disposed between two of the teeth which are adjacent to each other in the circumferential direction of the annular core back, the bridging wire engaging portions protruding from an upper surface of the core back towards the shield sheet, and the bridging wiring portions being girdled by the conductor wire.

3. The spindle motor according to claim 2, wherein the bridging wire engaging portions are provided between all of the circumferentially adjacent teeth of the stator core.

4. The spindle motor according to claim 1, wherein the teeth of the stator core are bent with portions of the teeth around which the conductor wire of the at least one winding is wound being offset from the tip ends of the teeth downwardly away from the magnetic shield sheet in the axial direction.

5. A spindle motor for use in holding and rotating a data storage disk, said spindle motor comprising:

a rotor assembly supported in the motor so as to be rotatable about a center axis extending in the axial direction of the motor, said rotor assembly including a rotor magnet comprising an annular arrangement of magnetic poles, and a disk mounting portion to which the disk is to be mounted, the disk mounting portion constituting an outer peripheral portion of the rotor assembly;

a stator opposing an outer peripheral portion of the rotor magnet and spaced radially therefrom such that a gap is present therebetween, the stator including a stator core having a plurality of teeth which are arrayed about the center axis and around which the conductor wires are wound, an annular core back from which the plurality of teeth extend radially inwardly such that tip ends of the teeth are oriented towards the center axis, and bridging wire engaging portions, and at least one winding in the form of a conductor wire wound around the teeth of the stator core, the bridging wire engaging portions protruding from an upper surface of the annular core back at inner peripheral portions of the annular core back, respectively, each of the bridging wire engaging portions being disposed between two of the teeth which are adjacent to each other in the circumferential direction of the annular core back, and the bridging wiring portions being girdled by the conductor wire; and an annular shield sheet of a soft magnetic material located between the disk mounting portion of the rotor assembly and the winding with respect to the axial direction, an outer peripheral edge of the shield sheet extending radially inwardly of the bridging wire engaging portions.

6. The spindle motor according to claim 5, wherein the shield sheet has recesses therein which are aligned in the axial direction with at least portions of the teeth, respectively, around which the conductor wire is wound, and segments of the conductor wire occupy the recesses in the shield sheet.

7. The spindle motor according to claim 6, wherein the number of segments of the conductor wire extending across each of the teeth per unit length varies along the length of the teeth in the radial direction.

8. The spindle motor according to claim 6, wherein the height in the axial direction of the at least one winding as measured at those portions of the teeth over which the recesses in the shield plate extend is greater than the height in the axial direction of the at least one winding as measured radially inwardly of the recesses adjacent the tip ends of the teeth.

9. A disk driving device comprising:

a housing; a spindle motor secured to the housing; a data storage disk mounted to and rotated by the spindle motor; and an access unit including a head movable across the data storage disk to access the disk, wherein the spindle motor has a rotor assembly supported in the motor so as to be rotatable about a center axis extending in the axial direction of the motor, a stator, and a shield sheet of a soft magnetic material, the rotor assembly including a rotor magnet comprising an annular arrangement of magnetic poles, and a disk mounting portion to which the disk is mounted, the annular arrangement of magnetic poles having opposite ends in the axial direction of the motor, and the disk mounting portion constituting an outer peripheral portion of the rotor assembly, the stator opposing an outer peripheral portion of the rotor magnet and spaced radially therefrom such that a gap is present therebetween, the stator including a stator core having a plurality of teeth which are arrayed about the center axis, and an annular core back from which the plurality of teeth extend radially inwardly such that tip ends of the teeth are oriented towards the center axis, and at least one winding in the form of a conductor wire wound around the teeth of the stator core, and the shield sheet being located between the disk mounting portion of the rotor assembly and the winding in the axial direction of the motor as disposed at the same level in the axial direction as at least a portion of the rotor magnet, the shield sheet having an inner peripheral edge located radially across from and encircling the rotor magnet at a level in the axial direction of the motor between respective outer peripheral edges of the opposite ends of the annular arrangement of magnetic poles, and the outer diameter of the shield sheet being equal to or smaller than that of the annular core back.

10. The hard disk driving device according to claim 9, wherein the head of the access unit is interposed between the magnetic shield plate and the disk in the axial direction of the spindle motor when the head is accessing the disk.

11. A spindle motor for use in holding and rotating a data storage disk, the spindle motor comprising:
a rotor assembly supported in the motor so as to be rotatable about a center axis extending in the axial direction of the motor, the rotor assembly including a rotor magnet comprising an annular arrangement of magnetic poles, and a disk mounting portion to which the disk is to be mounted, the disk mounting portion constituting an outer peripheral portion of the rotor assembly;
a stator opposing an outer peripheral portion of the rotor magnet and spaced radially therefrom such that a gap is present therebetween, the stator including a stator core and at least one winding in the form of a conductor wire, the stator core having a plurality of teeth which are arrayed about the center axis and around which the conductor wire of the at least one winding is wound, an annular core back from which the plurality of teeth extend radially inwardly such that tip ends of the teeth are oriented towards the center axis, and bridging wire engaging portions located at inner peripheral portions of the annular core back, respectively, each of the bridging wire engaging portions being disposed between two of the teeth which are adjacent to each other in the circumferential direction of the annular core back, the bridging wire engaging portions protruding from an upper surface of the core back, and the bridging wire engaging portions being girdled by the conductor wire; and
a shield sheet of a soft magnetic material located between the disk mounting portion of the rotor assembly and the winding with respect to the axial direction, wherein the shield sheet defines openings at portions thereof aligned in the axial direction with the bridging wires engaging portions, respectively, and the bridging wire engaging portions are received in the openings, respectively.

12. The spindle motor according to claim 11, wherein the bridging wire engaging portions are provided between all of the circumferentially adjacent teeth of the stator core.

13. The spindle motor according to claim 11, further comprising a base plate which retains the stator, and wherein an outer peripheral edge of the shield sheet is secured to the base plate.

14. The spindle motor according to claim 11, wherein the teeth of the stator core are bent with portions of the teeth around which the conductor wire of the at least one winding is wound being offset from the tip ends of the teeth downwardly away from the magnetic shield sheet in the axial direction.

15. A disk driving device comprising:
a housing; a spindle motor secured to the housing; a data storage disk mounted to and rotated by the spindle motor; and an access unit including a head movable across the data storage disk to access the disk,
wherein the spindle motor has a rotor assembly supported in the motor so as to be rotatable about a center axis extending in the axial direction of the motor, a stator, and a shield sheet of a soft magnetic material,
the rotor assembly including a rotor magnet comprising an annular arrangement of magnetic poles, and a disk mounting portion to which the disk is mounted, the disk mounting portion constituting an outer peripheral portion of the rotor assembly,
the stator opposing an outer peripheral portion of the rotor magnet and spaced radially therefrom such that a gap is present therebetween, the stator including a stator core and at least one winding in the form of a conductor wire, the stator core having a plurality of teeth which are arrayed about the center axis and around which the conductor wire of the at least one winding is wound, an annular core back from which the plurality of teeth extend radially inwardly such that tip ends of the teeth are oriented towards the center axis, and bridging wire engaging portions located at inner peripheral portions of the annular core back, respectively, each of the bridging wire engaging portions being disposed between two of the teeth which are adjacent to each other in the circumferential direction of the annular core back, the bridging wire engaging portions protruding from an upper surface of the core back, and the bridging wire engaging portions being girdled by the conductor wire, and
a shield sheet of a soft magnetic material located between the disk mounting portion of the rotor assembly and the winding with respect to the axial direction, wherein the shield sheet defines openings at portions thereof aligned in the axial direction with the bridging wires engaging portions, respectively, and the bridging wire engaging portions are received in the openings, respectively.

16. The hard disk driving device according to claim 15, wherein the head of the access unit is interposed between the magnetic shield plate and the disk in the axial direction of the spindle motor when the head is accessing the disk.

* * * * *